United States Patent
Ohe

(10) Patent No.: US 8,342,702 B2
(45) Date of Patent: Jan. 1, 2013

(54) VEHICLE DOOR MIRROR MOUNT STRUCTURE

(75) Inventor: Tomohiro Ohe, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 577 days.

(21) Appl. No.: 12/448,923

(22) PCT Filed: Oct. 16, 2008

(86) PCT No.: PCT/JP2008/068743
§ 371 (c)(1),
(2), (4) Date: Jul. 15, 2009

(87) PCT Pub. No.: WO2009/051174
PCT Pub. Date: Apr. 23, 2009

(65) Prior Publication Data
US 2010/0064592 A1  Mar. 18, 2010

(30) Foreign Application Priority Data
Oct. 16, 2007  (JP) ................... 2007-269062

(51) Int. Cl.
*G02B 7/182* (2006.01)
*B60R 1/06* (2006.01)

(52) U.S. Cl. ..... 359/871; 359/872; 296/1.11; 296/146.5
(58) Field of Classification Search ............ 359/841, 359/871, 872, 875; 296/1.11, 146.5
See application file for complete search history.

(56) References Cited

U.S. PATENT DOCUMENTS

| | | | | |
|---|---|---|---|---|
| 3,186,672 A | * | 6/1965 | Weder | 248/480 |
| 3,859,899 A | * | 1/1975 | Mills | 454/164 |
| 4,605,260 A | * | 8/1986 | Sakakibara et al. | 296/201 |
| 4,969,295 A | * | 11/1990 | Nishikawa et al. | 49/502 |
| 4,974,365 A | * | 12/1990 | Ono | 49/502 |
| 5,857,731 A | | 1/1999 | Heim et al. | |
| 6,176,542 B1 | * | 1/2001 | Gooding et al. | 296/146.6 |
| 6,637,900 B2 | * | 10/2003 | Ohashi | 359/871 |
| 6,669,267 B1 | * | 12/2003 | Lynam et al. | 296/146.5 |
| 6,824,279 B2 | * | 11/2004 | Shigesada et al. | 359/870 |
| 8,037,640 B2 | * | 10/2011 | Boddy et al. | 49/506 |
| 2002/0083648 A1 | | 7/2002 | Shigesada et al. | |
| 2005/0083596 A1 | * | 4/2005 | Jang | 359/879 |

FOREIGN PATENT DOCUMENTS

| | | |
|---|---|---|
| DE | 195 30 941 A1 | 2/1997 |
| GB | 1 333 456 | 10/1973 |
| GB | 2 396 881 A | 7/2004 |
| JP | 57-121319 | 7/1982 |
| JP | 58-157716 | 10/1983 |
| JP | 63-134815 | 9/1988 |
| JP | 2-97114 | 8/1990 |
| JP | 2000-309246 | * 11/2000 |
| JP | 2004-217033 | 8/2004 |
| JP | 2006-271633 | 10/2005 |

* cited by examiner

*Primary Examiner* — Ricky D Shafer
(74) *Attorney, Agent, or Firm* — Carrier Blackman & Associates, P.C.; Joseph P. Carrier; William D. Blackman

(57) ABSTRACT

A mount structure of a vehicle door mirror on a side door, the side door including: a door body having an outer panel and an inner panel which are joined together; and a door sash provided at an upper part of the door body so as to form an outer frame of the door body, wherein a door mirror mounting unit which mounts the door mirror is provided at an upper edge of the door body and at a vehicle front side of the door sash.

3 Claims, 6 Drawing Sheets

VEHICLE DOOR MIRROR MOUNT STRUCTURE

BACKGROUND OF THE INVENTION

1. Field of the Invention

The present invention relates to a mount structure of a door mirror to a vehicle side door.

Priority is claimed on Japanese Patent Application No. 2007-269062 filed Oct. 16, 2007, the content of which are incorporated herein by reference.

2. Background Art

Some vehicles have a substantially triangular-shaped front corner window at a front side of a front pillar to give occupants front, left and right views. Such a front corner window is fixed to a vehicle body.

A known mount structure of a vehicle door mirror includes a door mirror mounting unit attached to a front edge, which is formed wider, of a side door sash (see Japanese Unexamined Patent Application, First Publication No. 2004-217033).

The door mirror mounting unit of such a door mirror mounting structure is provided along the door sash at the front side of the vehicle. In this structure, the door mirror mounting unit and a mirror base may disadvantageously hinder occupants' visibility outside of the vehicle.

SUMMARY OF THE INVENTION

An object of the invention is to provide a mount structure of a vehicle door mirror which may provide occupants with a wider vision.

An aspect of the application provides the following configuration.

(1) A vehicle door mirror mounting mount structure of a door mirror on a side door, the side door including: a door body having an outer panel and an inner panel which are joined together; and a door sash provided at an upper part of the door body so as to form an outer frame of the door body, wherein a door mirror mounting unit which mounts the door mirror is provided at an upper edge of the door body and at a vehicle front side of the door sash.

(2) In the mount structure of the vehicle door mirror, the door mirror mounting unit may further include an inner mounting unit provided integrally with the inner panel, and a mirror stiffener provided integrally with an area at a vehicle front side of the door sash so as to correspond to the inner mounting unit.

(3) In the mount structure of the vehicle door mirror, the door mirror mounting unit may be located at a position corresponding to the inner mounting unit and the mirror stiffener, and may further include an outer mounting unit provided integrally with the outer panel.

(4) In the mount structure of the vehicle door mirror, the door mirror may include a lower fixing portion and an upper fixing portion; the lower fixing portion may be fixed to the side door via the inner mounting unit, the mirror stiffener and the outer mounting unit; and the upper fixing portion may be fixed to the side door via the inner mounting unit and the mirror stiffener.

(5) In the mount structure of the vehicle door mirror, the door mirror may include a door mirror body having a reflector, and a mirror base which is attached to the door mirror mounting unit so as to support the door mirror body; and a clearance may be defined between the mirror base and a periphery of a door opening at the side of a vehicle body when the side door is closed.

(6) The mount structure of the vehicle door mirror may further include a seal garnish which abuts the side door, the seal garnish provided at the periphery of the door opening at least at a position corresponding to the door mirror mounting unit.

The seal garnish provided at the periphery of the door opening is made to abut the side door when the side door is closed, thereby sealing the vicinity of the door mirror mounting unit.

(7) The mount structure of the vehicle door mirror may further include a seat base provided between the mirror base and the door mirror mounting unit so as to abut both of the mirror base and the door mirror mounting unit, the seat base including a sealing rib which abuts the seal garnish.

The seal garnish provided at the periphery of the door opening is made to abut the sealing rib on the seat base when the side door is closed, thereby sealing the vicinity area of a joint section of the door mirror mounting unit and the mirror base.

(8) In the mount structure of the vehicle door mirror, the seat base may be formed by an elastic member.

(9) The mount structure of the vehicle door mirror may further include a wind noise control member provided in the clearance defined between the mirror base and the periphery of the door opening at the vehicle body side.

(10) In the mount structure of the vehicle door mirror, the wind noise control member may be provided at the periphery of the door opening at the vehicle body side and further inside of the vehicle with respect to an outer surface of the vehicle.

(11) The mount structure of the vehicle door mirror may further include a seat base provided between the mirror base and the door mirror mounting unit so as to abut both of the mirror base and the door mirror mounting unit, wherein the wind noise control member is a wind noise control rib provided to protrude from a part of the seat base.

(12) The mount structure of the vehicle door mirror, may further includes a mirror garnish which covers the door mirror mounting unit and a back part of the seat base at the vehicle inner side, wherein: the mirror garnish includes a bent portion in which an upper end of the mirror garnish is bent toward the seat base; and an end of the bent portion adheres closely to the seat base via a sealing member.

According to the aspect (1), since the door mirror mounting unit is provided at an upper edge of the door body and at a vehicle front side of the door sash, the door mirror mounting unit and the mirror base does not notably hinder occupants' visibility outside of the vehicle and may provide occupants with improved visibility.

According to the aspect (2), mounting rigidity of the door mirror can be improved.

According to the aspect (3), mounting rigidity of the door mirror can further be improved. In addition, the outer mounting unit may give unity to the outer panel and door mirror, thereby improving the appearance quality.

According to the aspect (4), mounting rigidity and appearance quality of the door mirror can be improved. A structure around the door mirror mounting unit and a mounting process thereof may be simplified.

According to the aspect (5), interference between the mirror base and the periphery of the door opening upon opening and closing of the side door can be reliably prevented.

According to the aspect (6), the seal garnish at the periphery of the door opening abuts the side door when the side door is closed. Thus, ingression of wind or water drops into from around the door minor mounting unit can be reliably prevented.

According to the aspect (7), ingression of wind or water drops from around the door mirror mounting unit can be reliably prevented with a significantly simple structure.

According to the aspect (8), since the seat base is formed of an elastic member, the manufacturing process can be simplified and adhesiveness between the seat base and the seal garnish may be improved.

According to the aspect (9), occurrence of wind noise through the clearance between the periphery of the door opening and the mirror base can be reliably controlled by the wind noise control member.

According to the aspect (10), the wind noise control rib can be substantially invisible from outside of the vehicle so that appearance quality of the vehicle may be improved.

According to the aspect (11), occurrence of wind noise may be prevented with an easy-to-manufacture configuration.

According to the aspect (12), a waterproof performance of the door may be improved.

REFERENCE NUMERALS

Figure 1:
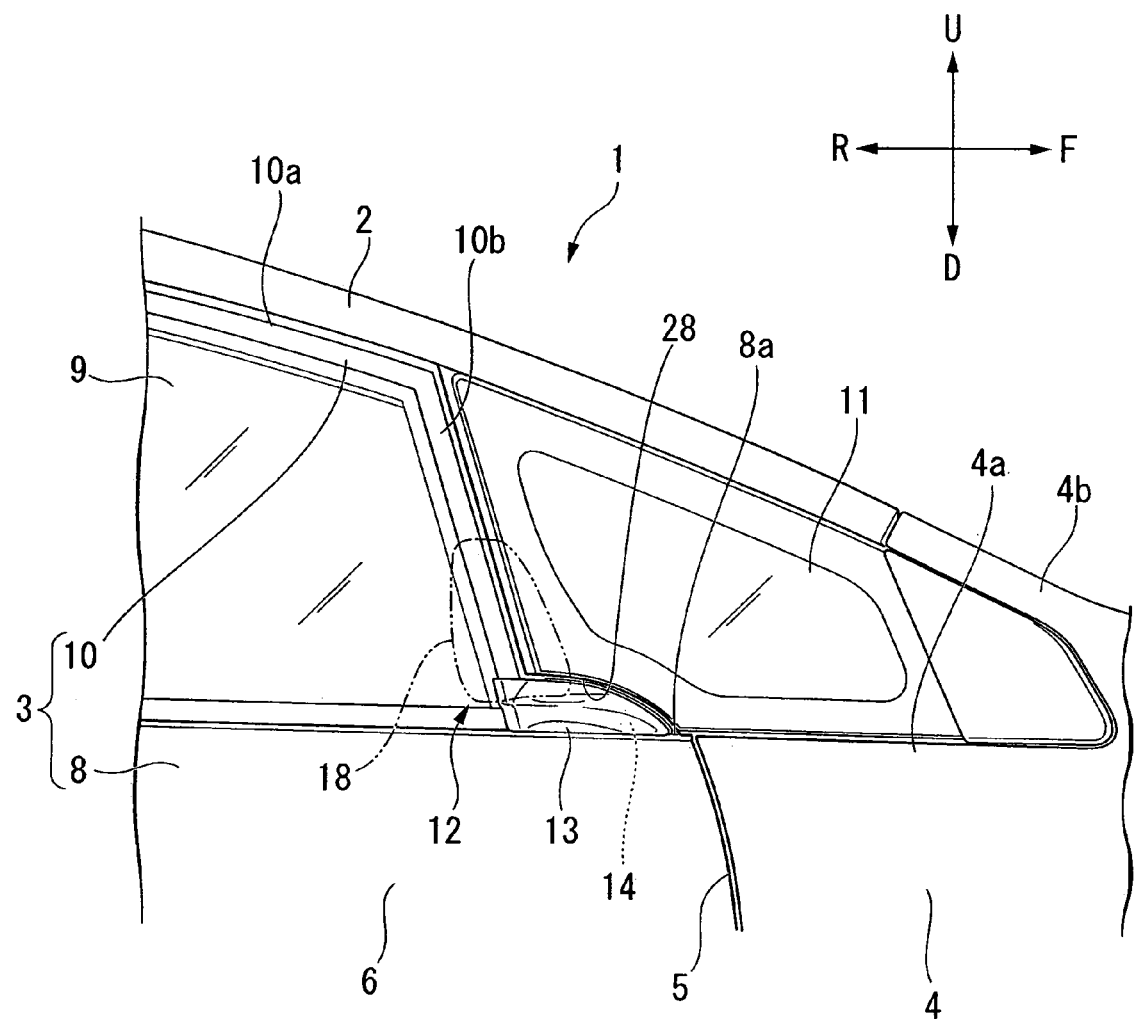
FIG. 1 shows a part of a right side of a vehicle according to an embodiment of the invention.

3: side door
6: outer panel
7: inner panel
8: door body
9: door window glass
10: door sash
12: door mirror
13: mirror base
14: door mirror mounting unit
18: door mirror body
19: seat base
d: clearance
31: seal garnish
32: sealing rib
33: wind noise control rib (wind noise control member)

DETAILED DESCRIPTION OF THE INVENTION

Referring now to the drawings, an embodiment of the invention will be described. In the following description, the terms "upper," "lower," "front" and "rear" correspond to directions of those members mounted on a vehicle body unless otherwise noted. Arrows U, D, O and I represent directions of upper, lower, outside and inside of the vehicle, respectively.

Figure 2:
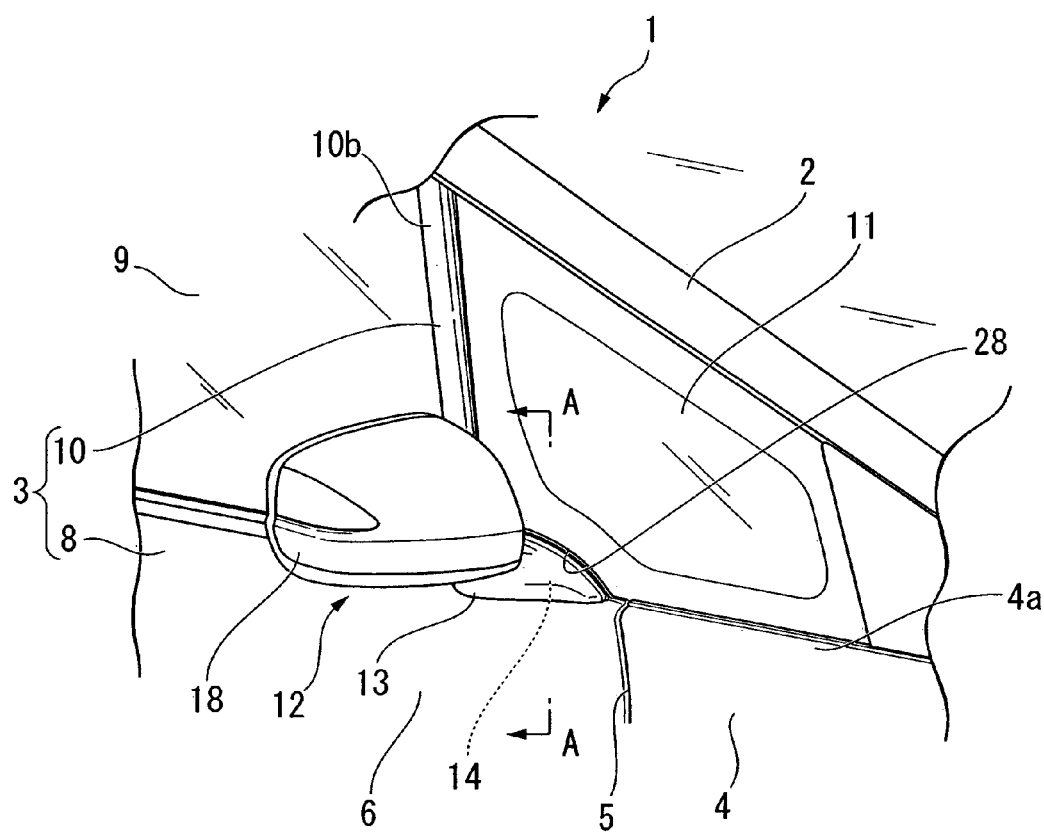
FIG. 2 shows a front right side of the vehicle according to the embodiment seen from an obliquely upper point.
Figure 2:
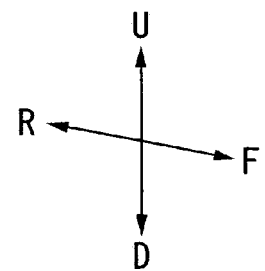

FIGS. 1 and 2 illustrate a vehicle 1 provided with a door mirror mounting structure according to the invention. In the drawings, a front pillar provided continuously to a vehicle roof is denoted by a reference numeral 2, a side door is denoted by 3 and a body side panel is denoted by 4. The body side panel 4 forms a part of a periphery 5 of a side door opening.

Figure 3:
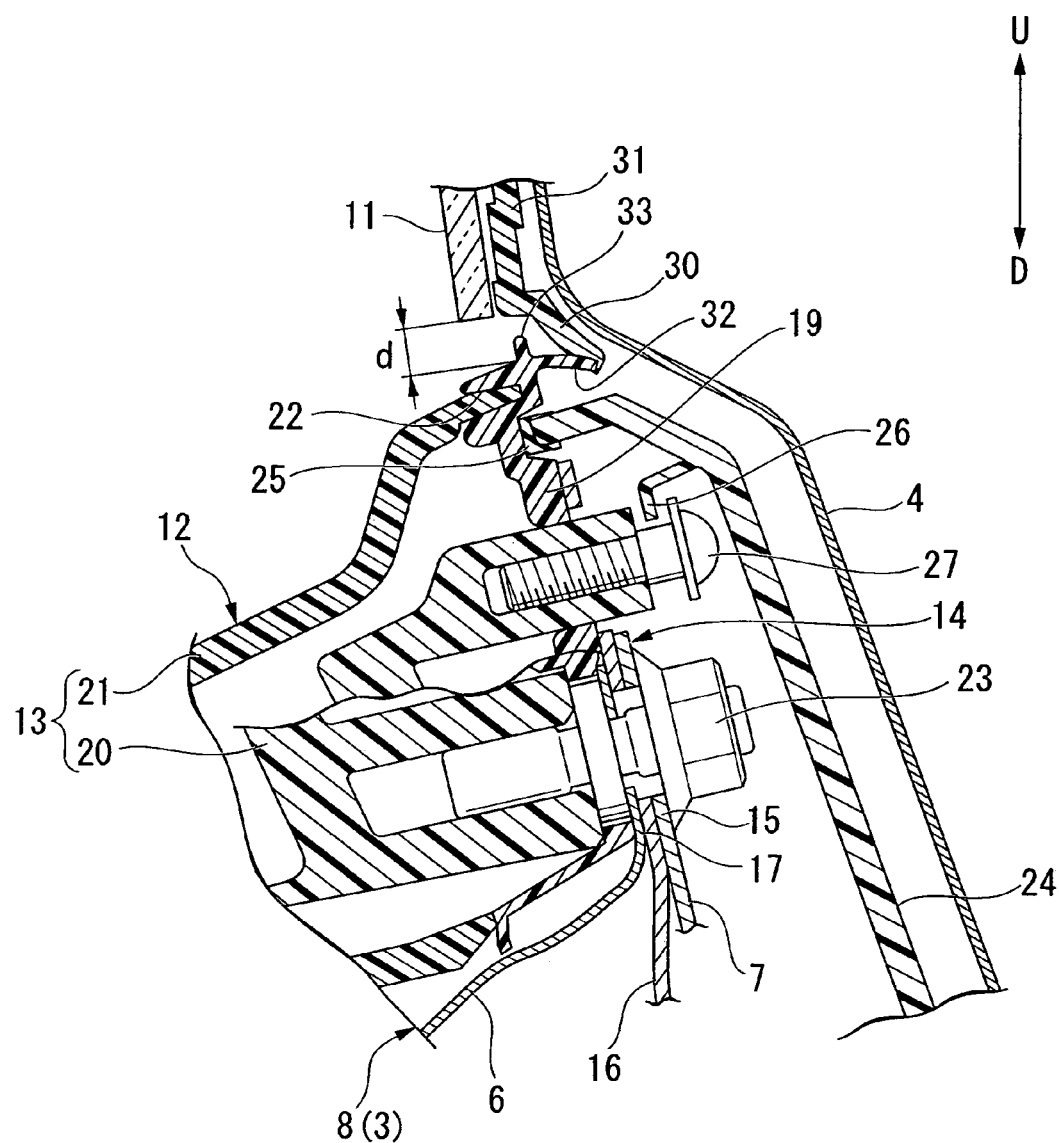
FIG. 3 is a cross-sectional view of the embodiment taken along line A-A in FIG. 2.
Figure 4:
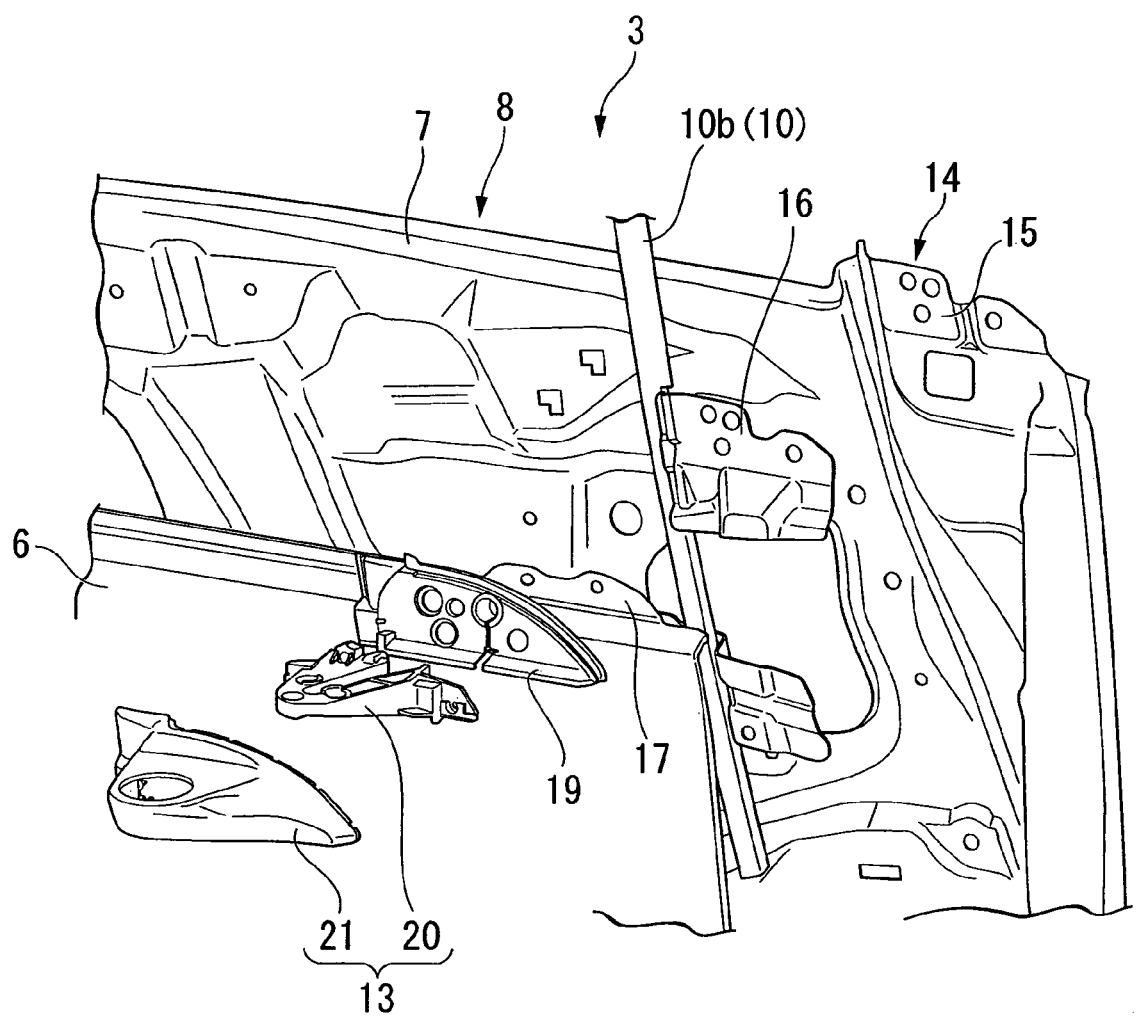
FIG. 4 is an exploded perspective view of the front right side of the vehicle according to the embodiment seen from an obliquely upper point.
Figure 4:
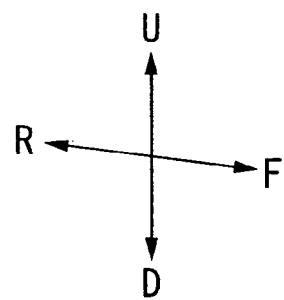

FIG. 3 shows a cross section taken along line A-A in FIG. 2. FIG. 4 is an exploded view of a front portion of the side door 3.

The side door 3 includes a door body 8 and a door sash 10. The door body 8 includes an outer panel which forms a side surface of the vehicle body and an inner panel attached to a vehicle inner side of the outer panel. The door sash 10 is provided integrally with an upper part of the door body 8 so as to form an outer frame of the door body 8. In the present embodiment, the door sash 10 holds an outer periphery of a door window glass 9 supported by the door body 8 so as to be movable upward and downward.

The body side panel 4 includes, at an upper part thereof, a horizontal portion 4a which continues from an upper edge of the door body 8, and a diagonal portion 4b which continues from the front pillar 2. A substantially triangular-shaped front corner window 11 is attached to an acute angled frame between the two portions 4a and 4b and a front edge of the front pillar 2. Here, the periphery 5 of the vehicle body at a front side of the door opening is formed by the body side panel 4 and the front corner window 11.

The door sash 10 includes an upper portion 10a and a front portion 10b. The upper portion 10a is disposed along the inclination of the front pillar 2. A front and of the upper portion 10a is bent to form the front portion 10b, of which the lower end is connected into the door body 8. The front portion 10b crosses an upper portion 8a of the door body 8 at a position apart from a front end of the door body 8 by a predetermined distance toward a rear side of the vehicle. Thus, the upper portion 8a of the door body 8 protrudes by a predetermined distance toward the front side of the vehicle from the front portion 10b of the door sash 10. A door mirror mounting unit 14 is attached to an area defined at a vehicle front side of the door sash 10 on the upper portions 8a of the door body 8. To the door mirror mounting unit 14, a mirror base 13 of a door mirror 12, which will be described later, is attached.

As shown in FIG. 4, a support piece 15 slightly protruding upward from the rest of the upper portion 8a of the door body 8 is provided continuously to a front end of the inner panel 7 of the side door 3. A mirror stiffener 16 is connected to an outside surface of the support piece 15. The mirror stiffener 16 is provided integrally with the front portion 10b of the door sash 10 so as to extend in a forward direction. A support piece 17 similar to the support piece 15 is provided on the front edge of the outer panel 6 of the side door 3 so as to correspond with the support piece 15 of the inner panel 7. The support piece 15 of the inner panel 7 and the support piece 17 of the outer panel 6 are mutually aligned with the mirror stiffener 16 disposed therebetween. The mirror base 13 of the door mirror 12 is attached to the mutually aligned support pieces 15 and 17 with a bolt. The door mirror mounting unit 14 is formed by the support pieces 15 and 17 and the mirror stiffener 16.

As shown in FIG. 3, the support piece 15 of the inner panel 7, the mirror stiffener 16 and the support piece 17 of the outer panel 6 are fixed together with a bolt 23 at a lower part of the door mirror mounting unit 14. The support piece 15 of the inner panel 7 and the mirror stiffener 16 are fixed together with an anchor bolt 27 at the upper part of the door mirror mounting unit 14.

An upper edge of the support piece 17 of the outer panel 6 is defined to be lower than an upper edge of the support piece 15 of the inner panel 7. Accordingly, the support piece 17 of the outer panel 6 is not fixed by the anchor bolt 27. With this configuration, rigidity and appearance quality of the door mirror mounting unit 14 will be improved. A structure around the door mirror mounting unit 14 and a mounting operation therefore will be simplified.

The door mirror 12 includes a door mirror body 18 and a mirror base 13. The door mirror body 18 holds an unillustrated reflector. The mirror base 13 rotatably supports the door mirror body 18. The base of the mirror base 13 is attached to the door mirror mounting unit 14 via a seat base 19 which is formed by a flexible resin material.

As shown in FIGS. 3 and 4, the mirror base 13 includes an inner base 20 and an outer base 21. The inner base 20 supports the door mirror body 18. The outer base 21 covers an outside of the inner base 20 and forms an outer surface of the vehicle. The thickness of the outer base 21 is relatively small with respect to a front-rear length of the vehicle and the depth in the width direction of the vehicle. That is, the outer base 21 is formed in a laterally extending, substantially right triangular configuration with a diagonal side inclined toward the vehicle front side gradually curving when seen in a side view. The outer base 21 has a curved configuration when seen in a top view in which a support portion of the door mirror body 18 at a substantially central portion along the front-rear direction expands at the maximum. The seat base 19, having almost the same contour as that of the outer base 21 when seen in a side view, is aligned with a base of the inner base 20 and the outer base 21. The base of the outer base 21 fits into a fitting groove 22 of an upper edge of the seat base 19. The base of the inner base 20 is connected to the door mirror mounting unit 14 of the side door 3 with the bolt 23 which penetrates the seat base 19 (see FIG. 3).

Figure 5:
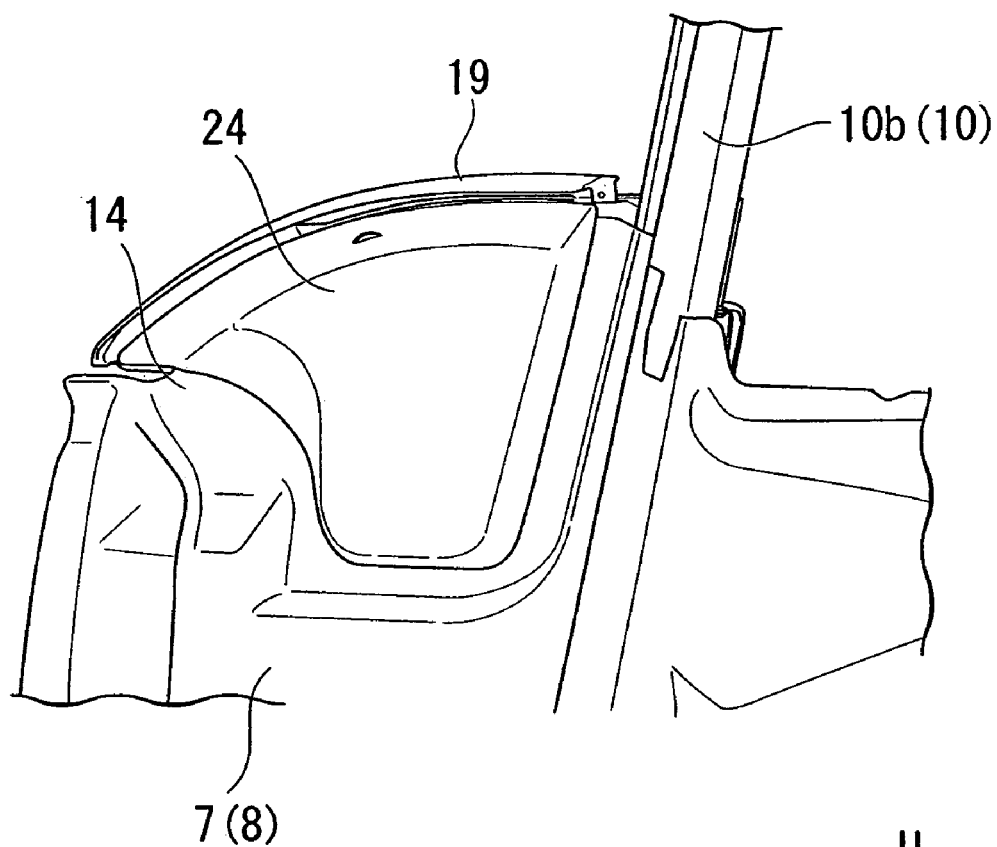
FIG. 5 shows a front right side of the vehicle according to the embodiment seen from the inside of the vehicle.
Figure 5:
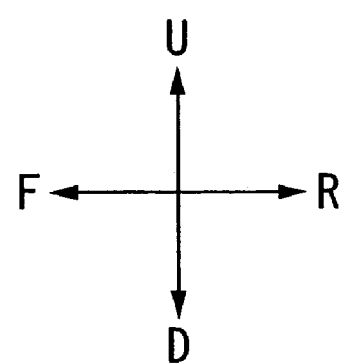

FIG. 5 illustrates the front portion of the side door 3 seen from the inside of the vehicle. In FIG. 5, a mirror garnish denoted by a reference numeral 24 covers the backs of the door mirror mounting unit 14 and the mirror base 13 at the inner side of the vehicle. An upper end of the mirror garnish 24 is bent toward the mirror base 13 as shown in FIG. 3. An end of the bent mirror garnish 24 adheres closely to a sealing member 25 attached to the back of the seat base 19. As shown in FIG. 3, the mirror garnish 24 includes a locking pawl 26 protruding therefrom. An end of the locking pawl 26 is anchored by a head of the anchor bolt 27 provided to protrude from the seat base 19.

A curved cutout 28 which is slightly larger than the mirror base 13 at a base side thereof is provided at a rear lower edge of the front corner window 11. When the side door 3 is closed (hereinafter referred to as "when the door is closed"), as shown in FIG. 3, the upper edge of the mirror base 13 (outer base 21) at the base side face the cutout 28 with a predetermined clearance d formed therebetween. A seal garnish 31 is attached to the front corner window 11 at the inner side of the vehicle at least at an area facing the cutout 28. The seal garnish 31 includes a sealing piece 30 which extends below the cutout 28. The seal garnish 31 is formed of a resin material. The sealing piece 30 extends from the cutout 28 of the front corner window 11 by a length greater than the clearance d.

Figure 6:
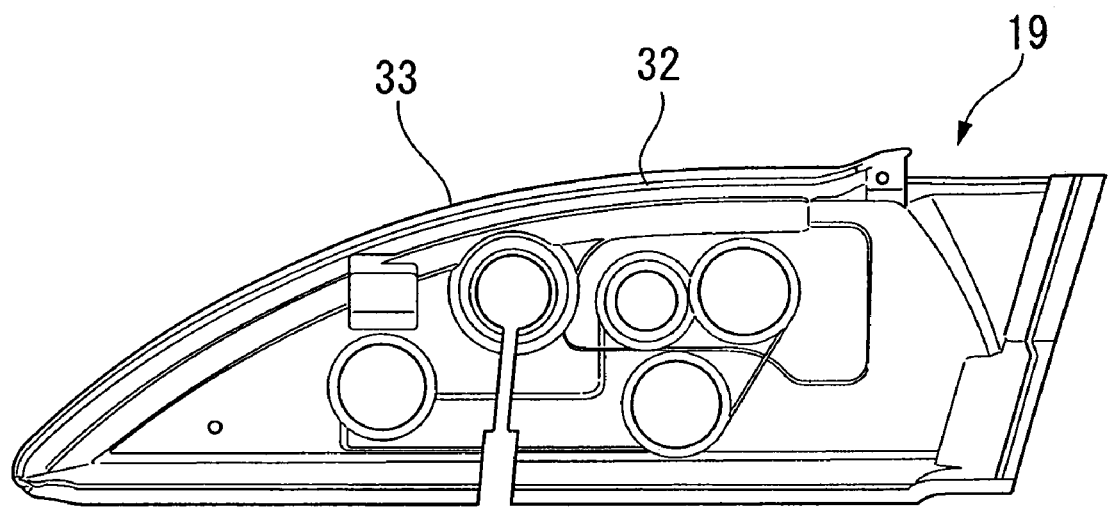
FIG. 6 shows a seat base according to the embodiment seen from the inside of the vehicle.
Figure 6:
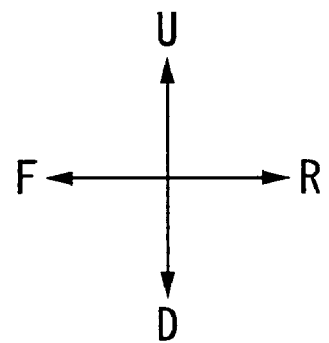

FIG. 6 shows the seat base 19 seen from the inside of the vehicle. As shown in the drawing, a sealing rib 32 extending toward the inside of the vehicle is integrally provided at the upper edge of the seat base 19. As shown in FIG. 3, an end portion and an upper edge of the sealing rib 32 abut the sealing piece 30 at the side of the seal garnish 31 in an airtight manner when the door is closed.

A wind noise control rib 33 (wind noise control member) is provided at the upper edge of the seat base 19 along a longitudinal direction of the upper edge. A distal end of the wind noise control rib 33 is oriented upward. The wind noise control rib 33 is relatively thin as compared to the rest of the seat base 19 and is offset to the inside of the vehicle with respect to an outer surface of the front corner window 11 when the door is closed.

In the door mirror mounting structure described above, the door mirror mounting unit 14 for attaching the mirror base 13 is provided in the upper portion 8a of the door body 8 at a position further forward than the front portion 10b of the door sash 10. Thus, the door mirror mounting unit 14 and the mirror base 13 hardly protrude toward a space for accommodating the door window glass 9 or the front corner window 11. It therefore becomes unnecessary to widen the front portion 10b of the door sash 10 or to narrow the area of the front corner window 11 for the placement of the door mirror mounting unit 14. In addition, the door mirror mounting unit 14 or the mirror base 13 never hinders occupants' visibility outside of the vehicle. Accordingly, the door mirror mounting structure may provide occupants with a wider vision.

The door mirror mounting structure has a clearance d formed between the cutout 28 (i.e., the periphery 5 of the door opening) of the front corner window 11 and the mirror base 13 when the door is closed. The clearance d reliably avoids interference between the mirror base 13 and the front corner window 11 upon opening and closing of the side door 3.

In the door mirror mounting structure, the sealing piece 30 of the seal garnish 31 provided at the front corner window 11 covers the clearance d from the back of the front corner window 11. With this structure, ingression of wind or water drops through the clearance d which may be provided between the cutout 28 and the mirror base 13 as described above may be reliably prevented.

In the present embodiment, the sealing rib 32 is integrally provided at the upper edge of the seat base 19 so as to protrude toward the inside of the vehicle. The sealing rib 32 is made to abut the sealing piece 30 of the seal garnish 31 when the door is closed. Thus, ingression of wind or water drops from around the door mirror mounting unit 14 may be more reliably prevented with a significantly simple structure. Especially in this case, since the entire seat base 19 is formed of a flexible resin material, the sealing rib 32 flexibly deforms to adhere tightly to the sealing piece 30 of the seal garnish 31 when the door is closed, thereby providing an absorption of the abutting impact and thus a reliable sealing performance. The seat base 19 may be formed of a flexible resin material in an advantageously simple manufacturing process.

In the door mirror mounting structure, the wind noise control rib 33 is provided to protrude from the upper edge of the seat base 19 facing the back side of the front corner window 11. The wind noise control rib 33 prevents running wind from directly flowing into a groove defined by the sealing piece 30 at the side of the seal garnish 31 and the sealing rib 32 through the clearance d between the cutout 28 of the front corner window 11 and the mirror bases 13. In this manner, occurrence of wind noise may be prevented. Alternatively, the wind noise control rib 33 may be provided separately from the seat base 19. In the present embodiment, the wind noise control rib 33 is provided integrally with an upper edge of the seat base 19 so as to simplify the manufacturing process and reduce the number of parts, thereby reducing the manufacturing cost.

In the present embodiment, the wind noise control rib 33 on the seat base 19 is offset to the inside of the vehicle with respect to an outer surface of the front corner window 11 which forms a part of the periphery 5 of the door opening. With this configuration, the wind noise control rib 32 is hardly visible from outside of the vehicle so that the appearance quality of the vehicle may be improved.

It is to be understood that the above-described embodiment of the invention is illustrative only and various modifications may be made without departing from the sprit and scope of the invention.

Since the door mirror mounting unit is provided at the upper edge of the door body and at a vehicle front side of the door sash, the door mirror mounting unit and the mirror base may hardly hinder occupants' visibility outside of the vehicle and may provide occupants with improved visibility.

What is claimed is:

1. A mount structure of a vehicle door mirror on a side door, the side door including: a door body having an outer panel and an inner panel which are joined together; a door sash provided at an upper part of the door body so as to form an outer frame of the door body; a door mirror mounting unit which mounts the door mirror is provided at an upper edge of the door body and at a vehicle front side of the door sash; wherein: the door mirror includes a door mirror body having a reflector, and a mirror base which is attached to the door mirror mounting unit so as to support the door mirror body; and a clearance is defined between the mirror base and a periphery of the door opening at the side of a vehicle body when the side door is closed; a seal garnish which abuts the side door, the seal garnish provided at a periphery of a door opening at least at a position corresponding to the door mirror mounting unit; and a seat base provided between a minor base and the door mirror mounting unit so as to abut both of the mirror base and the door mirror mounting unit, the seat base including a sealing rib which abuts the seal garnish.

2. A mount structure of the vehicle door minor according to claim 1, wherein the seat base is formed by an elastic member.

3. A mount structure of the vehicle door minor according to claim 1, further comprising a minor garnish which covers the door minor mounting unit and a back part of the seat base at the vehicle inner side, wherein:

the mirror garnish includes a bent portion in which an upper end of the mirror garnish is bent toward the seat base; and an end of the bent portion adheres closely to the seat base via a sealing member.

* * * * *